(12) United States Patent
Onomatsu et al.

(10) Patent No.: US 7,440,036 B2
(45) Date of Patent: Oct. 21, 2008

(54) TELEVISION RECEIVER THAT PRODUCES A CONTRACTED IMAGE

(75) Inventors: Takehiro Onomatsu, Daito (JP);
Kentaro Eto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 531 days.

(21) Appl. No.: 11/116,380

(22) Filed: Apr. 28, 2005

(65) Prior Publication Data
US 2005/0243212 A1 Nov. 3, 2005

(30) Foreign Application Priority Data
Apr. 28, 2004 (JP) ............... 2004-132344

(51) Int. Cl.
*H04N 1/393* (2006.01)
*H04N 5/44* (2006.01)

(52) U.S. Cl. .................. 348/581; 348/704; 348/568; 348/561; 348/553

(58) Field of Classification Search ............ 348/581, 348/704, 576, 561, 568, 565, 734, 588, 553; 382/298; 345/670, 472.1, 472, 660
See application file for complete search history.

(56) References Cited

U.S. PATENT DOCUMENTS

| | | | |
|---|---|---|---|
| 5,467,142 A | 11/1995 | Ichinokawa | |
| 6,008,860 A * | 12/1999 | Patton et al. | 348/565 |
| 6,262,763 B1 * | 7/2001 | Totsuka et al. | 348/135 |
| 6,304,238 B1 * | 10/2001 | Tsuchida | 345/87 |
| 6,317,164 B1 * | 11/2001 | Hrusecky et al. | 348/581 |
| 6,556,252 B1 * | 4/2003 | Kim | 348/565 |
| 7,061,544 B1 * | 6/2006 | Nonomura et al. | 348/568 |

FOREIGN PATENT DOCUMENTS

| | | |
|---|---|---|
| JP | 5-304641 | 11/1993 |
| JP | 06-086187 | 3/1994 |
| JP | 10-164433 A | 6/1998 |
| JP | 11-015425 | 1/1999 |
| JP | 2002-049365 | 2/2002 |
| JP | 2003-58101 A | 2/2003 |

OTHER PUBLICATIONS

Japanese Office Action dated Oct. 2, 2007 with English Translation (Three (3) pages).

* cited by examiner

*Primary Examiner*—David Ometz
*Assistant Examiner*—Jean W Désir
(74) *Attorney, Agent, or Firm*—Crowell & Moring LLP

(57) ABSTRACT

Even when a user is by the immediate side of a screen of a large screen television receiver such as a plasma TV receiver, the user can view an image displayed on the screen entirely by contracting the image to be displayed, and power consumption of the television receiver can be reduced. When the user choose a contraction mode for displaying the image with contraction, the video signal processor performs pixel skipping of video data corresponding to predetermined pixels to video data of a television signal received by a tuner. The display panel displays a contracted image with an initial contraction ratio at an initial display position on a screen of the display panel with using the processed video data. The contraction ratio and the display position of the contracted image on the screen of the display panel can be varied optionally by operating a wireless remote controller, corresponding to a distance between the user and the screen of the display panel or according to the user's predilection.

13 Claims, 4 Drawing Sheets

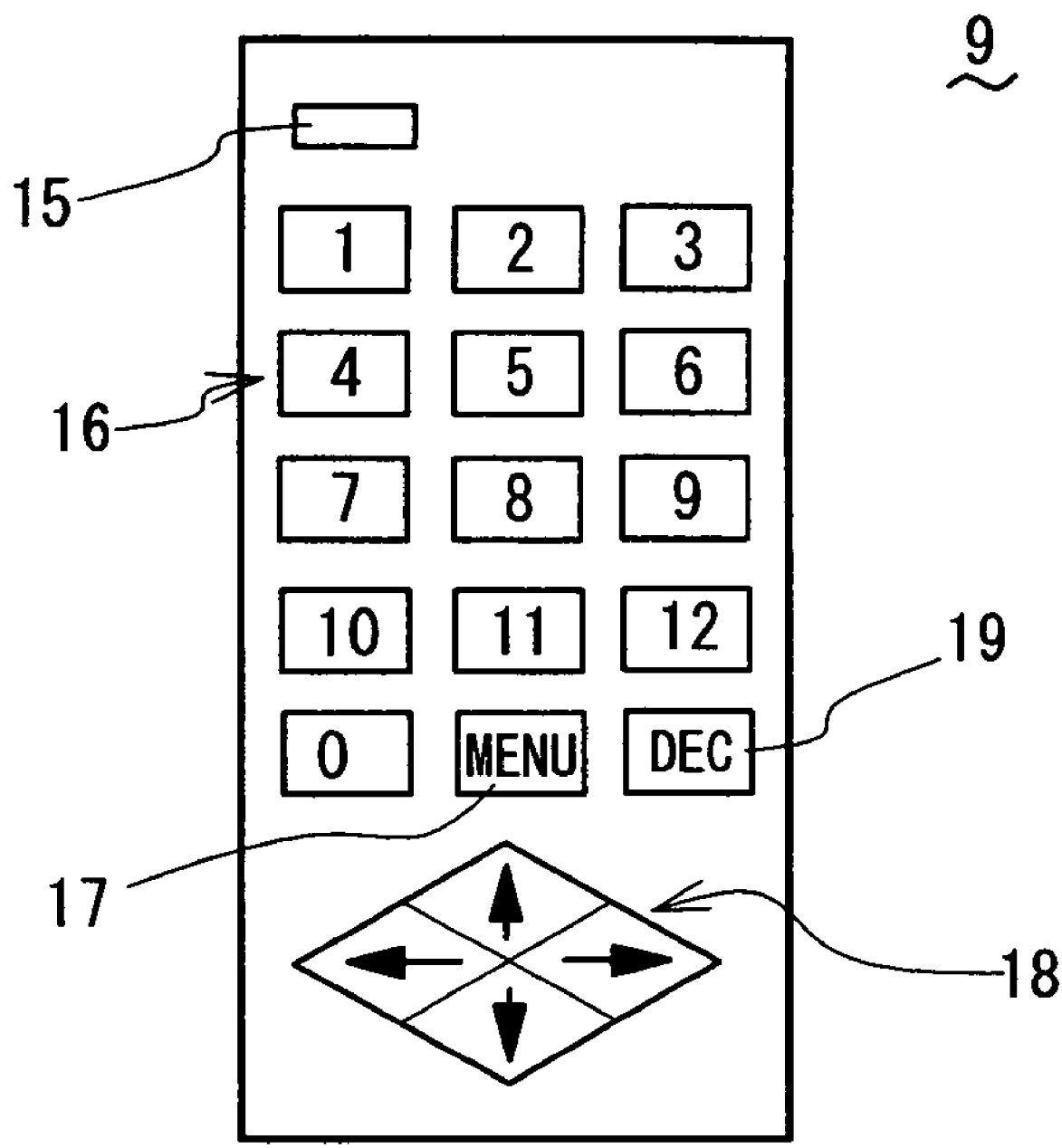

TELEVISION RECEIVER THAT PRODUCES A CONTRACTED IMAGE

BACKGROUND OF THE INVENTION

1. Field of the Invention

The present invention relates to a television receiver having a relatively large scale display screen such as plasma display panel.

2. Description of the Related Art

In recent years, a plasma display panel attracts attention as a thin display panel which is superior in visibility. Upsizing and price-reduction of a television receiver using a plasma display panel are progressing rapidly. Similarly, downsizing and price-reduction of a liquid crystal display panel are realized.

In a television receiver which can display a plurality of images on the same display screen, it is possible to adjust a size of an image corresponding to a number of images to be displayed or an aspect ratio of the image (see, for example, Japanese Laid-Open Patent Publication No. 6-86187). In addition, a television receiver, which can display all information of caption at an optimum location on a display screen in various display modes accompanied with alteration of screen size (see, for example, Japanese Laid-Open Patent Publication No. 5-304641).

On the other hand, it is known that a display apparatus which can control switching of display modes independently, without intervening a personal computer (see, for example, Japanese Laid-Open Patent Publication No. 11-15425), and another display apparatus which can contracting a display area of an image and relocate a position of the contracted image after passing a predetermined term (see, for example, Japanese Laid-Open Patent Publication No. 2002-49365).

By such a large screen television receiver, a user can enjoy a very punchy image, when the user leaves from the screen in a wide living room. Alternatively, when the user views the screen at close quarters due to housing situation, he cannot view the display screen entirely, so that the visibility will be worse, if anything.

In addition, the large screen television receiver consumes an electric power in proportion to an area of the display screen, so that it is expected to save power consumption. There, however, is a program such as weather forecast which does not need so large display area though a user views. If entire display screen is used for displaying such a program needs no large area, unnecessary electric power is wasted, and it will be against requirement of power saving.

Even if a technique shown in any of the above-mentioned prior art is applied, the assignment stated above cannot be solved. In addition, since Japanese Laid-Open Patent Publication No. 2002-49365 shows a technique for contracting a display area of an image and relocating the position the contracted image, but it is not suitable for a television receiver because the position of the image is relocated in disregard of the users wish.

SUMMARY OF THE INVENTION

A purpose of the present invention is to provide a television receiver, by which a user can view an image displayed on a display screen entirely at close quarters, and electric power consumption can be reduced.

A television receiver in accordance with an aspect of the present invention comprises a tuner for receiving a television broadcast signal, a video signal processor for performing a predetermined processing to the television broadcast signal received by the tuner, a display panel for displaying an image with using a video signal processed by the video signal processor, a controller for controlling each element of the television receiver, and a wireless remote controller operated by a user for inputting command signals to the controller.

The video signal processor contracts an image to be displayed on the display panel and displays the contracted image in a part of display area of the display panel, corresponding to a predetermined command signal inputted to the controller from the wireless remote controller.

By such a configuration, even when the user is by the immediate side of the screen of the display panel, the image to be displayed can be contracted to a suitable screen size which can be viewed entirely by the user. Consequently, the visibility of the television receiver can be increased.

It is possible that the video signal processor can vary a contraction ratio of the contracted image corresponding to a predetermined command signal inputted to the controller from the wireless remote controller, and the wireless remote controller can be operated by a user so as to set the contraction ratio of the contracted image optionally.

By such a configuration, the screen size of the contracted image to be displayed can be varied optionally, for example, corresponding to a distance between the user and the screen of the display panel or according to the user's predilection.

Furthermore, it is possible that the video signal processor can vary a display position of the contracted image on a screen of the display panel corresponding to a predetermined command signal inputted to the controller from the wireless remote controller, and the wireless remote controller can be operated by a user so as to set the display position of the contracted image.

By such a configuration, the display position of the contracted image on the screen of the display panel can be varied optionally, for example, corresponding to a distance between the user and the screen of the display panel or according to the user's predilection.

Still furthermore, it is possible that the video signal processor can vary a contraction ratio of the contracted image and a display position of the contracted image on a screen of the display panel corresponding to predetermined command signals inputted to the controller from the wireless remote controller, and the wireless remote controller can be operated by a user so as to set the contraction ratio and the display position of the contracted image.

By such a configuration, the screen size and/or the display position of the contracted image on the screen of the display panel can be varied optionally, for example, corresponding to a distance between the user and the screen of the display panel or according to the user's predilection.

It is possible that the contracted image is displayed at a substantially center of the screen of the display panel as an initial position before varying the display position of the contracted image.

When the display panel is a plasma display panel, it is possible that no driving voltage is applied to light emitting elements in an area which are not used for displaying the contracted image.

Alternatively, when the display panel is a liquid crystal display, it is possible that a backlight thereof is constituted by a plurality of light emitting tubes or light emitting devices, and a plurality of the light emitting tubes or the light emitting devices is partially lit corresponding to the screen size and display position of the contracted image.

By such configurations, it is possible to reduce power consumption of the television receiver can be reduced.

BRIEF DESCRIPTION OF THE DRAWINGS

FIG. 2 is a plan view showing an appearance of a wireless remote controller of the above-mentioned TV receiver;

DETAILED DESCRIPTION OF THE EMBODIMENT

Figure 1:
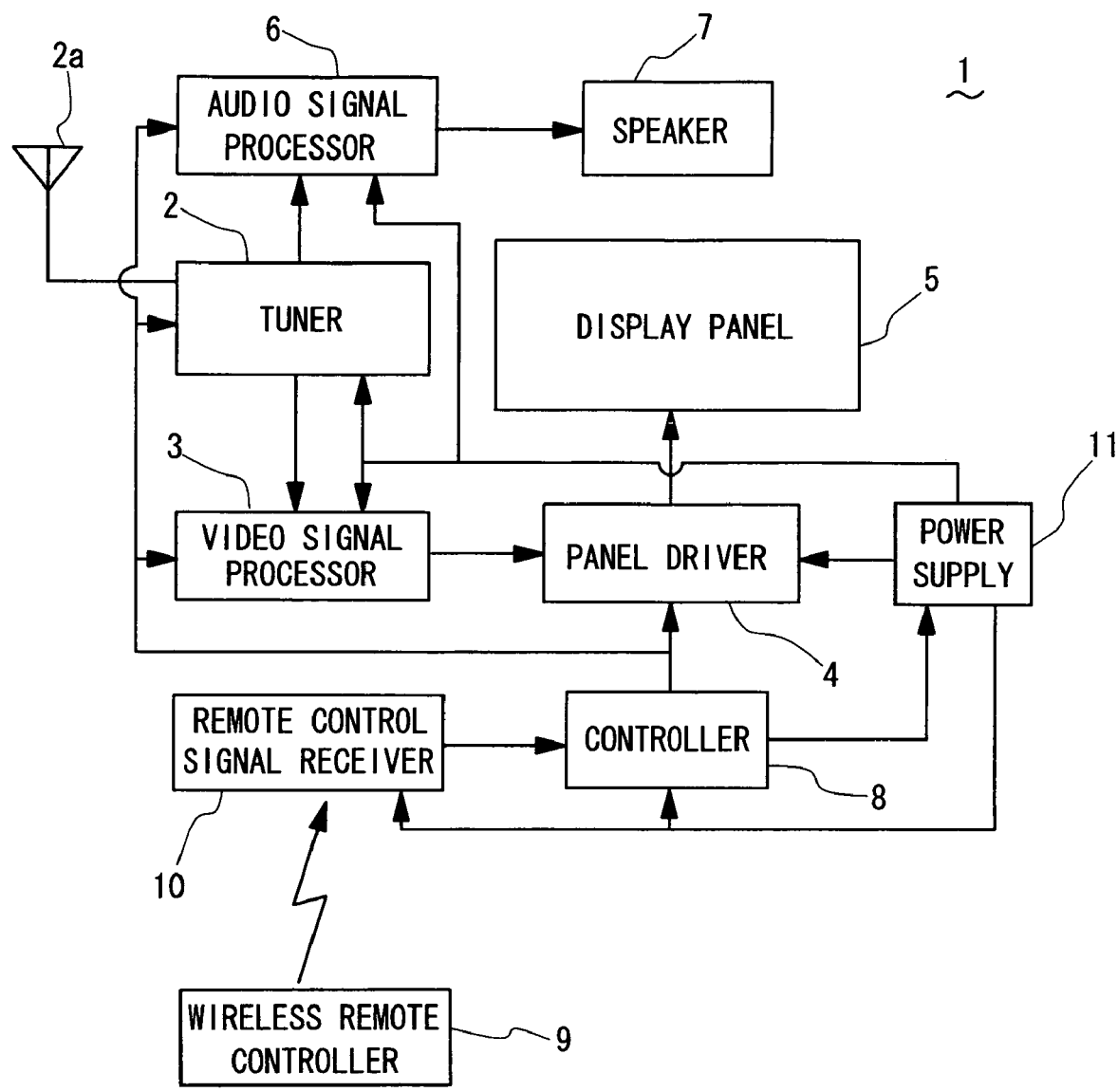
FIG. 1 is a block diagram of plasma TV receiver which is an example of a television receiver in accordance with an embodiment of the present invention.

A television receiver in accordance with an embodiment of the present invention is described with reference to the figures. FIG. 1 shows a plasma television receiver (hereinafter, it is abbreviated as plasma TV receiver) comprising plasma display panel as an example of the television receiver.

In the plasma TV receiver 1, a tuner 2 serving as a television broadcast signal receiving means receives a TV broadcast signal delivered from a TV station through an antenna 2a, and a video signal processor 3 serving as a video signal processing means for processing the TV broadcast signal received by the tuner 2 and outputs processed video data. A panel driver 4 serving as an image displaying means applies driving voltages to respective elements of a plasma display panel 5 corresponding to video data outputted from the video signal processor 3. The plasma display panel 5 serving as the image displaying means displays an image corresponding to the driving voltages applied to the elements by the panel driver 4. An audio signal processor 6 processes a predetermined processing to an audio signal received by the tuner 2. A speaker 7 outputs a sound corresponding to the audio signal outputted from the audio signal processor 6. A controller 8 serving as a control means controls the above-mentioned elements. A wireless remote controller 9 serving as a command input means is operated by a user and inputs various command signals to the controller 8. A remote control signal receiver 10 receives a command signal such as an infrared ray signal transmitted from the wireless remote controller 9, converts the command signal to an electric signal, and transmits the electric signal to the controller 8. An electric power supply 11 supplies an electric power to each element of the plasma TV receiver 1.

FIG. 2 shows the details of the wireless remote controller 9. The wireless remote controller 9 has a power operation key 15 for switching on/off of a power of the plasma TV receiver 1, a plurality of numeral input keys 16 used for selecting a channel to be received, a menu key 17 used for displaying menu items on the plasma display panel 5, a set of cursor keys (arrow pads) 18 used for choosing a desired menu item among the menu items displayed on the plasma display panel 5, and a determination key 19 for determining the menu item chosen by an operation of the cursor keys 18 by a user.

Since the plasma display panel 5 used for the plasma TV receiver 1 of this embodiment is a thin-and-light, it is suitable for large screen television receiver. A plasma display panel having a screen size larger than 100 inches is already put to practical use. The plasma TV receiver 1 is constituted so as not to reduce the visibility even when the user is by the immediate side of the plasma display panel 5, owing to contracting the image and displaying the contracted image in a part of display area of the plasma display panel 5.

The user can view the contracted image on an optional part of the display area of the plasma display panel 5 with operating the wireless remote controller 9. For example, when the user pushes the menu key 17 multiple times so as to select a contraction mode for displaying an image to be displayed on a screen of the plasma display panel 5 with contraction, a command signal (first command signal) corresponding to the operation of the menu key 17 is transmitted from the wireless remote controller 9, and a menu item relating to the contraction of the image display is displayed on the plasma display panel 5. Subsequently, when the user operates the numeral keys 16 or the cursor keys 18, a command signal (second command signal) corresponding to the key operation is transmitted from the wireless remote controller 9, so that it is possible to vary the screen size of the contracted image or to vary the display position at which the contracted image is displayed.

Figure 3A:
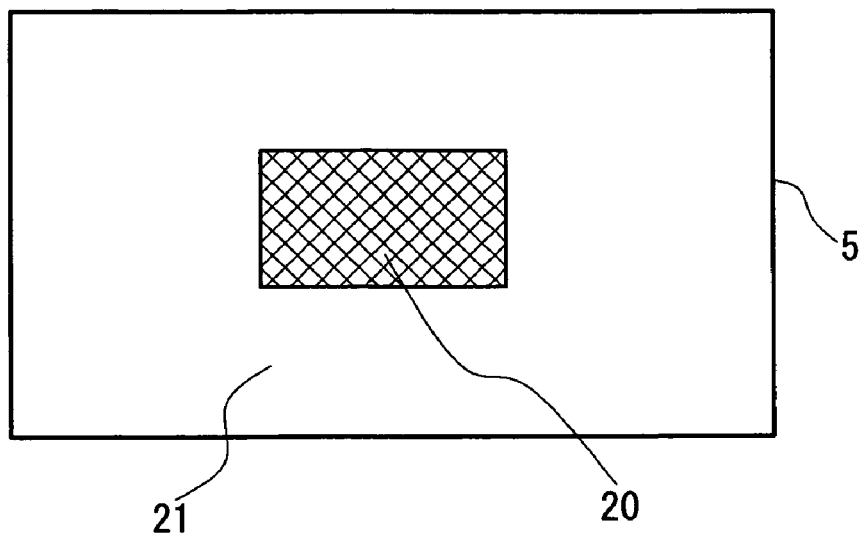
FIG. 3A is a schematic view showing a state that a contracted image is displayed at substantially the center of a plasma display panel.
Figure 3B:
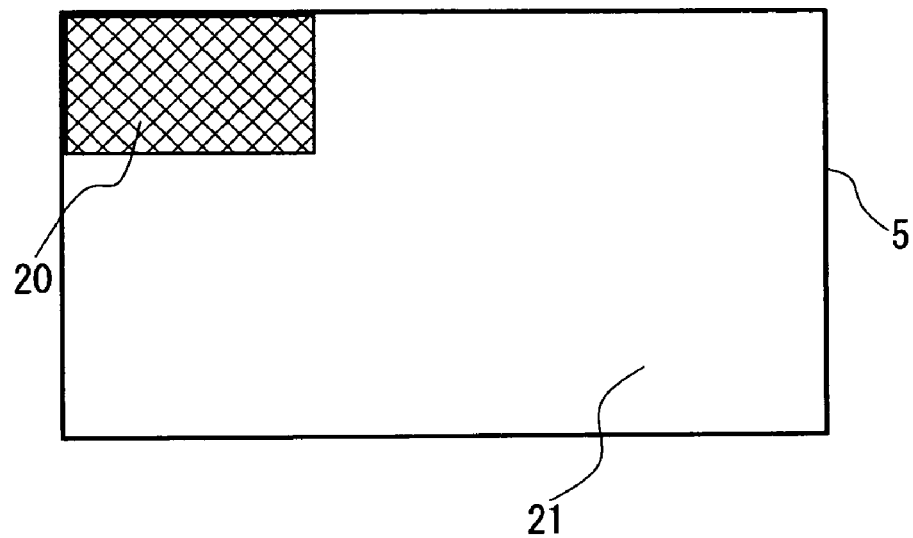
FIG. 3B is a schematic view showing a state that the contracted image is displayed at upper left end of the plasma display panel.
Figure 3C:
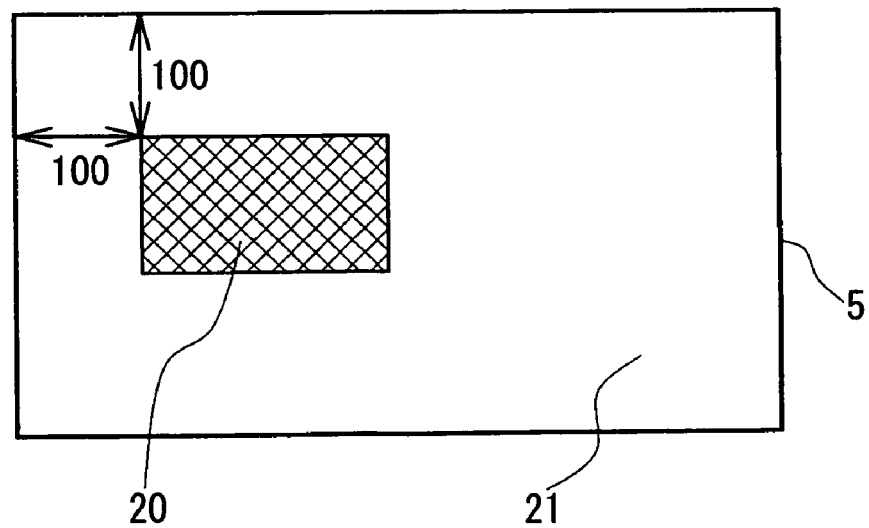
FIG. 3C is a schematic view showing a state that the contracted image is relocated on the plasma display panel.

FIGS. 3A to 3C and 4A to 4C respectively show examples of the contracted images displayed on the plasma display panel 5. FIG. 3A shows an initial state that a contracted image 20 is displayed on the plasma display panel 5. FIG. 3B shows a state that position of the contracted image 20 is relocated at upper left end of the plasma display panel 5. FIG. 3C shows a state that the position of the contracted image 20 is further relocated to 100 dots in right direction and 100 dots in lower direction from the upper left end of the plasma display panel 5.

Displaying of the contracted image 20 is performed by pixel skipping video data corresponding to predetermined pixels from the video data of the video signal outputted from the tuner 2 through the video signal processor 3. At this time, no driving voltage is applied to the elements in the area 21 in which the contracted image 20 is not displayed through the panel driver 4, so that power consumption of the plasma display panel 5 can be reduced.

When the user operates the cursor keys 18 under the state shown in FIG. 3A, a command signal (third command signal) corresponding to the key operation is outputted from the wireless remote controller 9, so that the contracted image 20 can be moved to desired direction, for example, as shown in FIG. 3B. Alternatively, when the user operates the numeral keys 16 under the state shown in FIG. 3A, the contracted image 20 can be moved to desired position, for example, as shown in FIG. 3C. Video data necessary for moving the contracted image 20 are generated through the video signal processor 3.

Figure 4A:
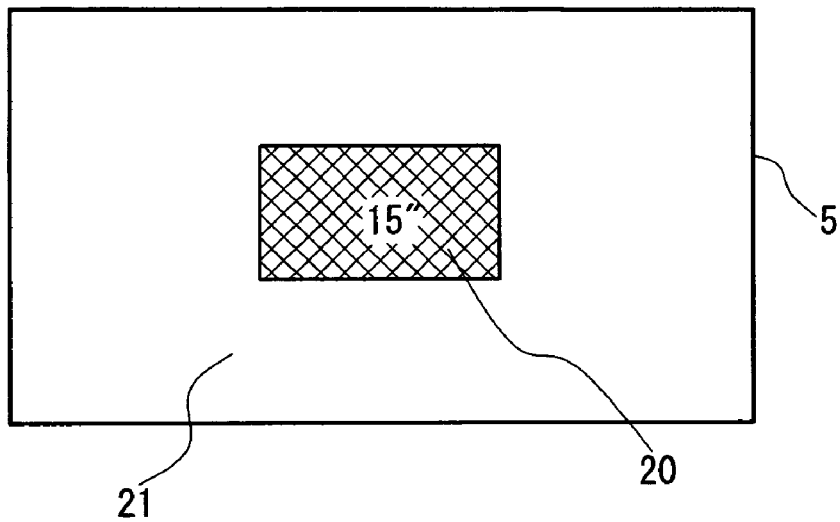
FIG. 4A is a schematic view showing an example that the contracted image is displayed in size of 15 inches on a plasma display panel of 40 inches.
Figure 4B:
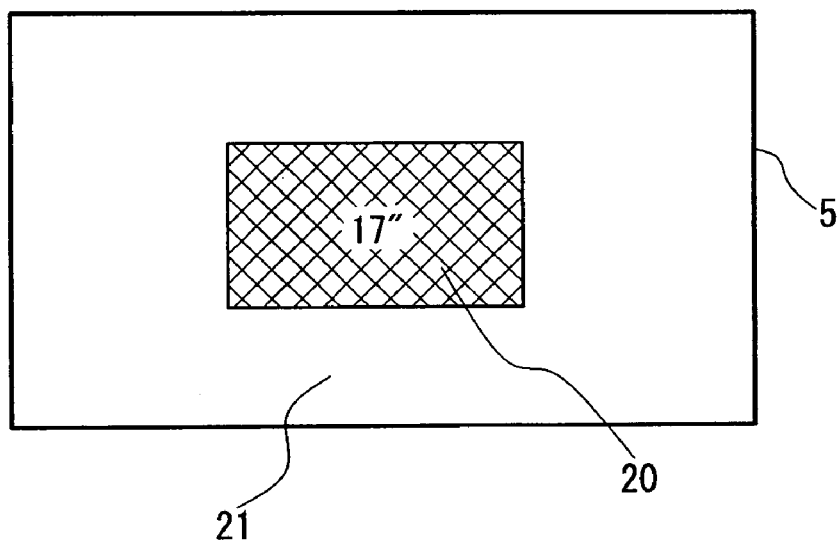
FIG. 4B is a schematic view showing an example that the contracted image is displayed in size of 17 inches on the plasma display panel of 40 inches.
Figure 4C:
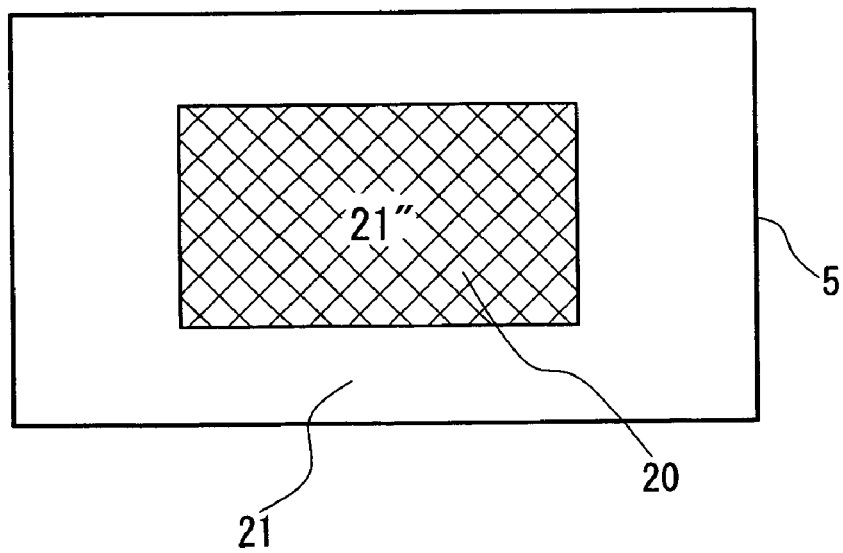
FIG. 4C is a schematic view showing an example that the contracted image is displayed in size of 21 inches on the plasma display panel of 40 inches.

FIG. 4A shows an initial state that the contraction image 20 is displayed with a screen size of 15 inches on the plasma display panel 5 which has a screen size of, for example, 40 inches. FIG. 4B shows a state that the screen size of the contraction image 20 is varied to 17 inches on the plasma display panel 5. FIG. 4C shows a state that the screen size of the contraction image 20 is varied to 21 inches on the plasma display panel 5.

When the user operates the cursor keys 18 under the state shown in FIG. 4A, a command signal (second command signal) corresponding to the key operation is outputted from the wireless remote controller 9, so that the screen size of the contracted image 20 can be varied to desired size in phase, as shown in FIG. 4B or 4C. Video signal necessary for varying the screen size of the contracted image 20 is generated through the video signal processor 3. Specifically, the video signal processor 3 generates video data necessary for displaying the contracted image 20 by pixel skipping the video data corresponding to predetermined pixels from the video data of the video signal outputted from the tuner 2 through the video signal processor 3. Furthermore, the contracted image 20 with the screen size of 17 inches or 21 inches can be moved to an optional position of the plasma display panel 5 from the state shown in FIG. 4B or 4C with operation the numeral keys 16 or the cursor keys 18 after switching the menu item with operation of the menu key 17.

According to the plasma TV receiver 1 as described above, the video signal processor 3 contracts an image to be displayed, and the contracted image is displayed on a part of the display area of the plasma display panel 5. Thus, the user can view the contracted image entirely, even when the user is by the immediate side of the screen. Consequently, the visibility of the plasma display panel 5 can be increased. Furthermore, it is possible to reduce an area of the plasma display panel 5 to which a driving voltage is applied, so that power consumption of the plasma TV receiver 1 can be reduced. Still furthermore, since the contraction ratio of an image (contracted image 20) to be displayed on the plasma display panel 5 can be varied, it is possible to vary the screen size of the image corresponding to room size (or a distance from the user to the screen) and according to the user's predilections. Still furthermore, since the display position of the contracted image 20 can be moved optionally, it is possible to display the contracted image 20 at a suitable position corresponding to the relation of the positions of the plasma TV receiver 1 and the user. Consequently, the convenience of the plasma TV receiver 1 can be increased.

The present invention is not limited to the above-mentioned embodiment, and it is possible perform various modifications. For example, when it is considered to reduce the consumption of the television receiver, a plasma display panel is suitable for a display panel used for displaying an image, since elements constituting a display screen directly emit lights and it can easily be upsized by increasing a number of arrays of the light emitting elements. A liquid crystal display panel, however, can be used as a display panel for displaying an image. In the latter case, it is possible to constitute a backlight of the liquid crystal display panel with a plurality of light emitting tubes or white LEDs (Light Emitting Diodes). By partially lighting the light emitting tubes or the LEDs corresponding to the position and size of the contracted image, it is possible to reduce the power consumption of the television receiver. Still furthermore, it is possible to sense a distance between the user and the display panel or positions of them, and the contraction ratio and/or display position of the contracted image are automatically varied, corresponding to the sensed distance or positions.

This application is based on Japanese patent application 2004-132344 filed Apr. 28, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A television receiver comprising:
a tuner for receiving a television broadcast signal;
a video signal processor for performing a predetermined processing to the television broadcast signal received by the tuner;
a display panel for displaying an image with using a video signal processed by the video signal processor;
a controller for controlling each element of the television receiver; and
a wireless remote controller operated by a user for inputting command signals to the controller; wherein
the video signal processor contracts an image to be displayed on the display panel and displays the contracted image in a part of display area of the display panel, corresponding to a predetermined command signal inputted to the controller from the wireless remote controller, and
a size of the contracted image is based on a distance between a user of the display panel and the display panel.

2. The television receiver in accordance with claim 1, wherein
the video signal processor can vary a contraction ratio of the contracted image corresponding to a predetermined command signal inputted to the controller from the wireless remote controller; and
the wireless remote controller can be operated by a user so as to set the contraction ratio of the contracted image optionally.

3. The television receiver in accordance with claim 1, wherein
the video signal processor can vary a display position of the contracted image on a screen of the display panel corresponding to a predetermined command signal inputted to the controller from the wireless remote controller; and
the wireless remote controller can be operated by a user so as to set the display position of the contracted image.

4. The television receiver in accordance with claim 3, wherein
the contracted image is displayed at a substantially center of the screen of the display panel as an initial position before varying the display position of the contracted image.

5. The television receiver in accordance with claim 1, wherein
the video signal processor can vary a contraction ratio of the contracted image and a display position of the contracted image on a screen of the display panel corresponding to predetermined command signals inputted to the controller from the wireless remote controller; and
the wireless remote controller can be operated by a user so as to set the contraction ratio and the display position of the contracted image.

6. The television receiver in accordance with claim 5, wherein
the contracted image is displayed at a substantially center of the screen of the display panel as an initial position before varying the display position of the contracted image.

7. The television receiver in accordance with claim 1, wherein
the display panel is a plasma display panel; and
no driving voltage is applied to light emitting elements in an area which are not used for displaying the contracted image.

8. The television receiver in accordance with claim 1, wherein the display panel is a liquid crystal display, and a backlight thereof is constituted by a plurality of light emitting tubes or light emitting devices; and a plurality of the light emitting tubes or the light emitting devices is partially lit corresponding to the screen size and display position of the contracted image.

9. The television receiver in accordance with claim 1, wherein a position of the part of the display area in which the contracted image is displayed is based on a position of a user relative to the display panel.

10. A television receiver comprising:

a television broadcast signal receiving means for receiving a television broadcast signal;

a video signal processing means for performing a predetermined processing to a television broadcast signal received by the television broadcast signal receiving means;

an image display means for displaying an image on a screen thereof with using a processed video signal processed by the video signal processing means;

a control means for controlling each component of the television receiver; and a command input means for inputting various command signals to the control means; wherein when a user operates the command input means so as to select a contraction mode for displaying an image to be displayed on a screen of the image displaying means with contraction, the command input means outputs a first command signal to the control means;

the video signal processing means performs a pixel skipping operation to a television broadcast signal received by the television broadcast signal receiving means for generating a video signal necessary for displaying a contracted image with an initial contraction ratio corresponding to the first command signal; and the image display means displays the contracted image with the initial contraction ratio at an initial position on the screen thereof;

when the user operates the command input means so as to vary the contraction ratio of the contracted image, the command input means outputs a second command signal the control means;

the control means varies the contraction ratio of the contracted image corresponding to the second command signal;

the video signal processing means performs the pixel skipping operation to the television broadcast signal for generating a video signal necessary for displaying a contracted image with a varied contraction ratio; and the image display means displays the contracted image with the varied contraction ratio at the initial position on the screen thereof;

when the user operates the command input means so as to move the display position of the contracted image to an optional position, the command input means outputs a third command signal the control means;

the control means calculates a display position at which the contracted image is to be displayed corresponding to the third command signal;

the video signal processing means performs a moving operation to the television broadcast signal for generating a video signal necessary for displaying a contracted image with an initial or varied contraction ratio;

the image display means displays the contracted image with the initial or varied contraction ratio at the display position on the screen thereof chosen by the user; and the initial or varied contraction ratio is based on a distance between the user of the display panel and the display panel.

11. The television receiver in accordance with claim 10, wherein the display panel is a plasma display panel; and no driving voltage is applied to light emitting elements in an area which are not used for displaying the contracted image.

12. The television receiver in accordance with claim 10, wherein the display panel is a liquid crystal display, and a backlight thereof is constituted by a plurality of light emitting tubes or light emitting devices; and a plurality of the light emitting tubes or the light emitting devices is partially lit corresponding to the screen size and display position of the contracted image.

13. The television receiver in accordance with claim 10, wherein the display position chosen by the user is based on a position of the user relative to the display panel.

* * * * *